United States Patent [19]

Murayama et al.

[11] 4,200,869

[45] Apr. 29, 1980

[54] DATA DISPLAY CONTROL SYSTEM WITH PLURAL REFRESH MEMORIES

[75] Inventors: Norio Murayama, Katsuta; Yukitaka Hayashi, Hitachi; Nagaharu Hamada, Hitachi; Toshitaka Hara, Hitachi, all of Japan

[73] Assignee: Hitachi, Ltd., Japan

[21] Appl. No.: 877,803

[22] Filed: Feb. 14, 1978

[30] Foreign Application Priority Data

Feb. 14, 1977 [JP] Japan .................................. 52-14875

[51] Int. Cl.[2] ................................................ G06F 3/14

[52] U.S. Cl. .................................... 340/723; 340/750; 340/726; 340/709; 340/721

[58] Field of Search ................ 340/324 AD, 798, 799, 340/800, 723, 726, 748, 750, 709, 721, 728

[56] References Cited

U.S. PATENT DOCUMENTS

| | | | |
|---|---|---|---|
| 3,242,470 | 3/1966 | Hagelbarger et al. | 340/726 |
| 3,524,181 | 8/1970 | Criscimagna et al. | 340/324 AD |
| 3,686,662 | 8/1972 | Blixt et al. | 340/324 AD |
| 3,771,155 | 11/1973 | Hayashi et al. | 340/324 AD |
| 3,976,831 | 8/1976 | Danell et al. | 340/728 |

*Primary Examiner*—Marshall M. Curtis
*Attorney, Agent, or Firm*—Craig and Antonelli

[57] ABSTRACT

A data display control system for displaying respective data memorized in a plurality of refresh memories which is operable in various display modes including a selective picture display, a superimposed picture display and a shifting picture display. Individual data memorized in respective refresh memories contain each a display control bit adapted to determine whether or not the individual data are to be displayed on the screen. The data display control system reads out from the respective refresh memories a data information to be picture-displayed and only when the contents of a display control bit contained in the data information designate a display, it converts this data information into a video signal for a picture display. The contents of the display control bit are changeable for individual data.

5 Claims, 14 Drawing Figures

DATA DISPLAY CONTROL SYSTEM WITH PLURAL REFRESH MEMORIES

LIST OF PRIOR ART REFERENCES

The following references are cited to show the state of the art:

U.S. Pat. No. 3,771,155 Hayashi et al Nov. 6, 1973

U.S. Pat. No. 3,821,730 Carey June 28, 1974

U.S. Pat. No. 3,903,510 Zobel Sept. 2, 1975

U.S. Pat. No. application Ser. No. 780,497, filed Mar. 23, 1977 in the name of Hara and assigned to the same assignee as this application, now U.S. Pat. No. 4,129,858.

BACKGROUND OF THE INVENTION

This invention relates to a data display control system and more particularly, to an improvement of a data display control system for use with a display device such as a CRT (cathode ray tube) display for displaying data thereon which is operable in various display modes including a selective picture display, a superimposed picture display and a shifting picture display.

In the past, it has already been proposed to superimpose a data information to be displayed on a CRT screen 11 upon a data information to be displayed independently of the former information on a CRT screen 12 in order to display a superimposed picture on a CRT screen 13, as shown in FIGS. 1*a* to 1*c*. For such a superimposition, a CRT display device is usually operated with an arrangement as shown in FIG. 2. More particularly, a data information (corresponding to that shown in FIG. 1*a*) and a second data information (corresponding to FIG. 1*b*) to be superimposed upon each other are respectively memorized into two refresh memories 24 and 25 from a CPU (central processor unit) via an interface 21 under the control of a read/write (R/W) control circuit 22 and a timing control circuit 23, and these data synchronously read out of the two memories 24 and 25 are composed in a video signal forming circuit 26 and transmitted to a viewer 27 comprised of a CRT display which, in turn, displays thereon a superimposed picture as shown in FIG. 1C. In FIG. 2, symbols AO to A1919 designate address numbers.

Alternatively, on the other hand, an approach has been made to a vertical or horizontal shift of the contents displayed on the screen, which approach is typically practicised as follows. As shown in FIG. 3, there is provided a refresh memory 35 for receiving and memorizing data commensurate with three picture frames from a CPU via an interface 31 under the control of a read/write (R/W) control circuit 32, the refresh memory 35 having continuous adresses AO to A1919, A1920 to A3839 and A3840 to A5759 for the three picture frames. In order that pictures displayed on a viewer 37 are shifted on the basis of a shift instruction from the CPU or a keyboard, a start address designating circuit 34 for designating a start address of the refresh memory on the basis of the shift instruction is incorporated in a timing control circuit 33. When a shift instruction occurs, reading of data information from the memory 35 is started at an address designated by the start address designating circuit 34 and the data information thus read out, following conversion into a video signal in a video signal forming circuit 36, is transmitted to a viewer 37. The data read out are successively displayed on the screen of viewer 37 in such a manner that the data information corresponding to the start address is positioned at the beginning of the screen. Thus, by changing the start address, the vertical or horizontal position of the data information displayed on the screen can be changed so that a so-called picture shift can be accomplished.

Incidentally, the aforementioned two prior art systems solely perform one of the two display modes, superimposition and shift of picture, and have no capability of practicising both the display modes selectively and independently of each other. Also, a recent trend demands availability of a CRT display device the display modes of which can be selected optionally by users.

SUMMARY OF THE INVENTION

An object of this invention is to provide an improved data display control system capable of selectively picture-displaying data memorized in a plurality of refresh memories.

Another object of this invention is to provide an improved data display control system capable of desirably superimposing data memorized in a plurality of refresh memories for their picture display.

Still another object of this invention is to provide an improved data display control system capable of displaying a series of data memorized in a plurality of refresh memories in a shifting mode fashion at a given rate.

According to this invention, a plurality of refresh memories are provided each memorizing display data corresponding to one picture frame. Individual display data contain a display control bit for determining whether or not the data information is to be displayed on the screen. When the plurality of refresh memories are driven synchronously and parallelly and the display data are read out of respective refresh memories successively, only read-out data whose display control bits are representative of permission to display the data on the screen are converted into video signals and composed for their display. The contents of the display control bit are freely changeable.

The above and other objects, features and effects will become more apparent from the following detailed description when taken in conjunction with the accompanying drawings.

DESCRIPTION OF THE PREFERRED EMBODIMENTS

Figure 1A:
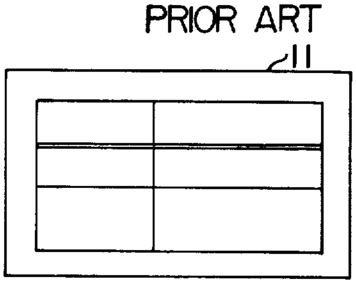
FIG. 1a PRIOR ART
FIGS. 1*a* to 1*c* are diagrammatic representations useful to explain the typical manner of superimposing display pictures conventionally used.
Figure 1B:
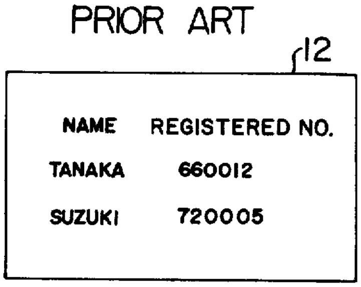
FIG. 1b PRIOR ART
Figure 1C:
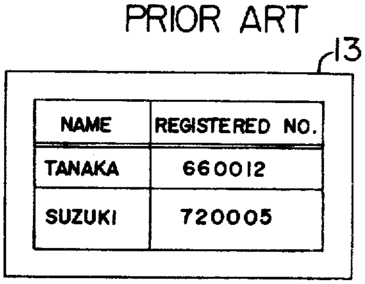
FIG. 1c PRIOR ART
Figure 2:
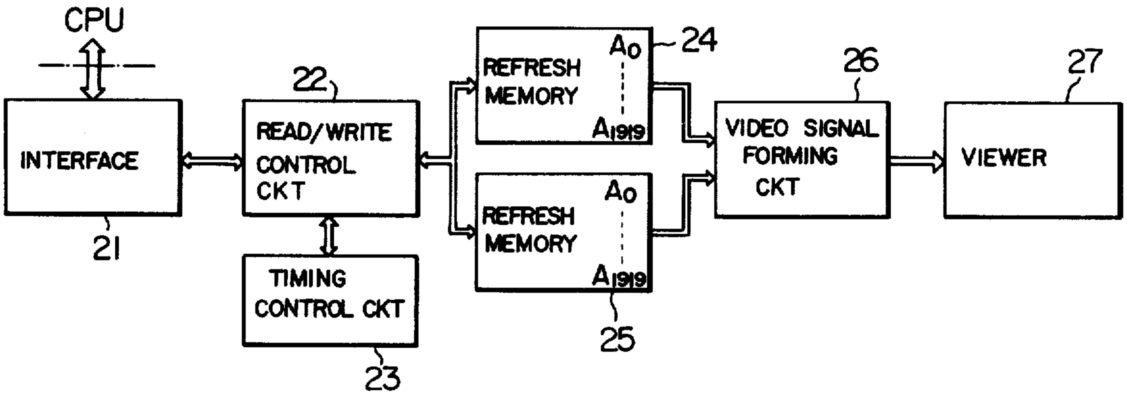
FIG. 2 PRIOR ART
FIG. 2 is a block diagram of a prior art arrangement for use with a CRT display device having the function of superimposing display pictures.
Figure 3:
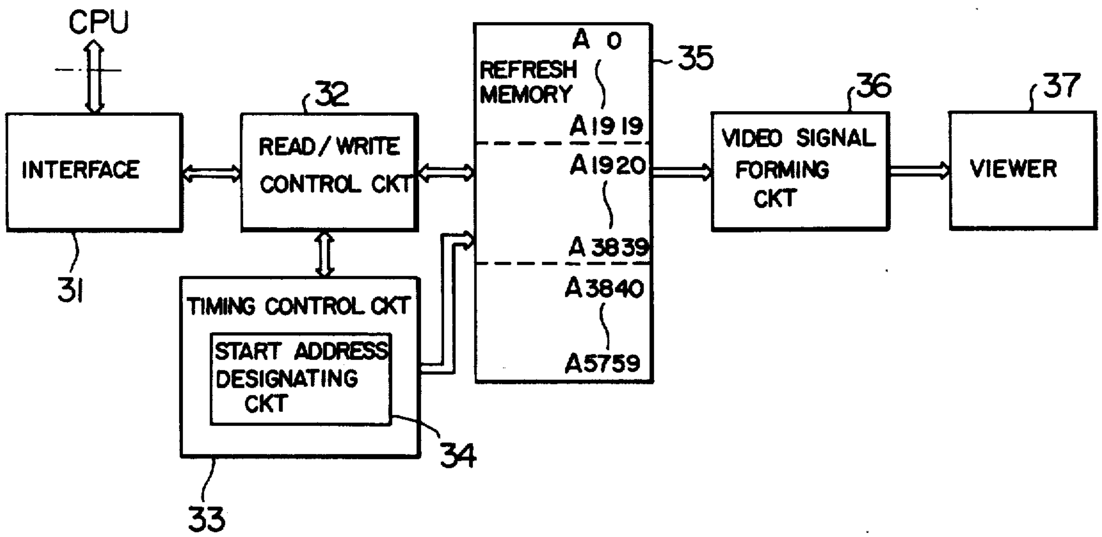
FIG. 3 PRIOR ART
FIG. 3 is a block diagram of a prior art arrangement for use with a CRT display device having the function of shifting display pictures.
Figure 4:
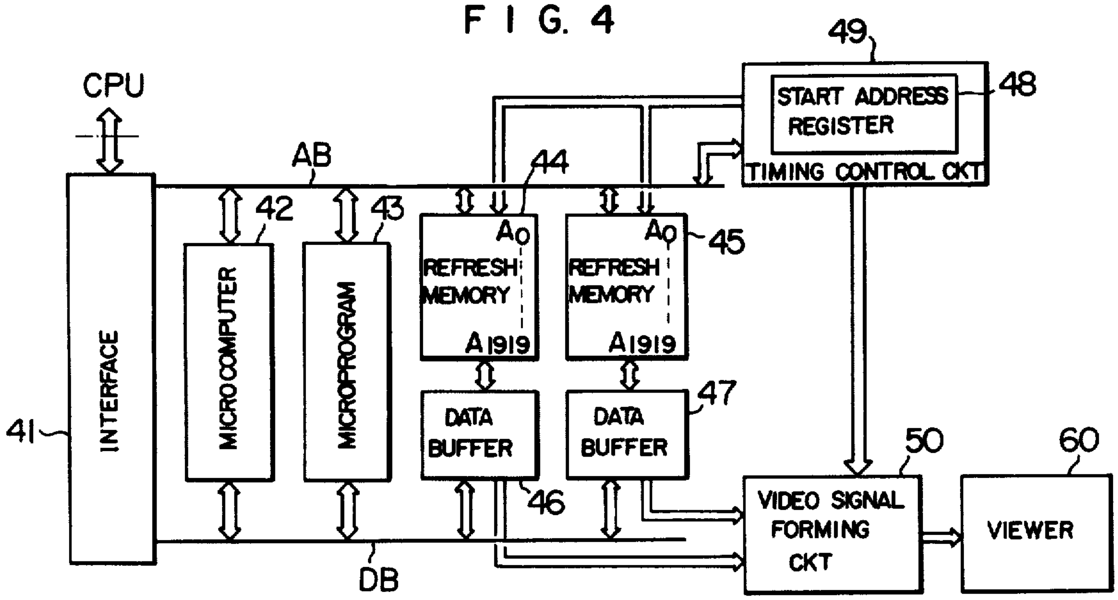
FIG. 4 is a block diagram of a universal type data display control system embodying the invention.

Referring now to FIG. 4, a universal type data display system for use with a CRT display device embodying the invention comprises an interface 41 communicating with a CPU, an address bus AB coupled with the interface 41, and a data bus DB also coupled with the interface 41. Connected to the address bus AB and data bus DB is a micro-computer 42 which executes a control operation to be described later with reference to FIG. 12 in accordance with a microprogram memorized in a microprogram memory 43. A pair of synchronous reading type refresh memories 44 and 45 having each addresses A0 to A1919 are connected to the address bus AB and their read-out or write-in operations are controlled by a timing signal from a timing control circuit 48 incorporated with a start address register 49 for designating a start address. Also, respective refresh memories 44 and 45 are connected, on the one hand, to the data bus DB via respective data buffers 46 and 47 and, on the other hand, to a video signal forming circuit 50. This circuit 50 is adapted to compose display data transmitted from the buffers 46 and 47 to form a video signal and controlled by the timing control circuit 48. The video signal formed by the video signal forming circuit 50 is transmitted to a viewer 60. The viewer 60 includes a CRT display and the contents of the video signal are visually displayed on its CRT screen. FIG. 4 shows, as an example, a CRT screen having a display capacity of 1920 characters (80 characters×24 lines).

The refresh memories 44 and 45 to be read out synchronously memorize a plurality of display data each of which is indicative of one character and added with a display control bit. One example of a memorized data format is illustrated at reference character RM in FIG. 6. Namely, the display data information as represented by the format RM includes a character/symbol code for designating characters and symbols to be displayed on the screen, a control code for controlling the display mode of the characters and symbols, and a display control bit, featuring this invention, for designating the permission to display the data. The state of the display control bit is determined by the micro-computer 42 in accordance with an external (by way of a CPU, key board, light-pen or the like) instruction. The video signal forming circuit 50 is incorporated with a circuit which determines, upon formation of the video signal, the permission to display data on the screen in accordance with the display control bit of each character/-symbol.

Figure 5:
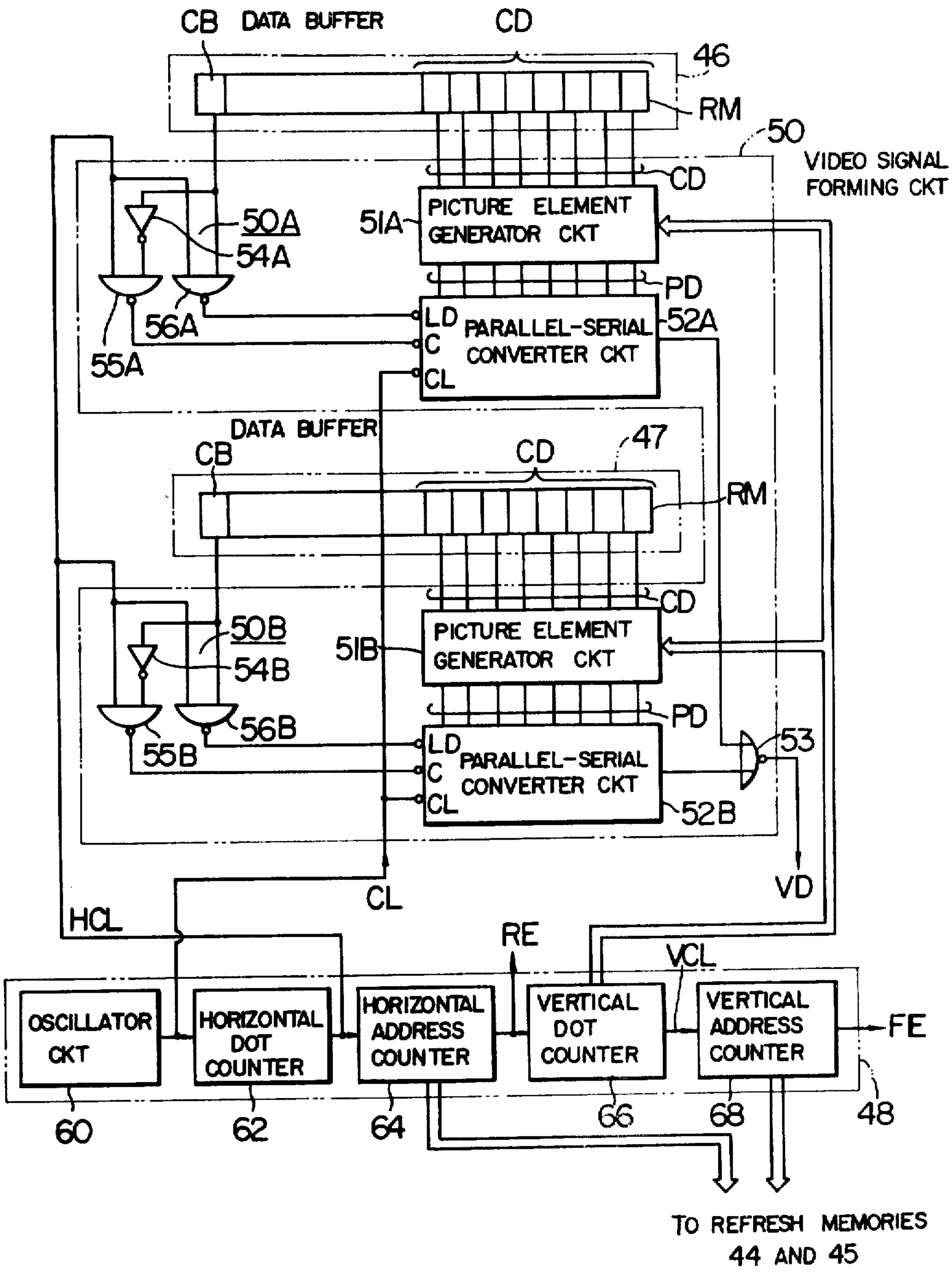
FIG. 5 is a circuit diagram of a video signal forming system incorporated in the data control system of FIG. 4.

Turning now to FIG. 5, a description will be given of how to form a video signal at the video signal forming circuit 50. The buffer registers 46 and 47 respectively memorize a display data information RM indicative of one character supplied from associated refresh memory for one character display period. The video signal forming circuit 50 receives from the buffer registers 46 and 47 a character/symbol code CD together with a display control bit CB to form a serial video signal VD which, in furn, is transmitted to the viewer 60. The video signal forming circuit 50 comprises picture element generator circuits 51A and 51B for converting the character/symbol code CD received from the buffer registers 46 and 47 respectively into a picture element data information PD, parallel-serial (P/S) converter circuits 52A and 52B for converting the parallel picture element data PD into serial signals, an OR-gate 53 for producing serial video signals VD by composing the outputs from the P/S converter circuits, and circuits 50A and 50B for controlling a load terminal LD and a clear terminal C of the P/S converter circuits 52A and 52B. The display screen includes 1920 unit display regions (80 characters×24 lines), for example, each unit display region being composed of 80 picture elements (dots) resulting from 8 columns×10 lines. The character/symbol display is carried out on the basis of raster-scan system wherein dots constituting characters in each line are displayed by each raster line. Accordingly, display data are read out successively at the buffer registers 46 and 47 as the scanning of raster line proceeds and dot matrixes of character/symbol resulting from character/-symbol codes CD of the display data, so that picture element data PD for a given line corresponding to a raster line being not scanned are delivered. The circuits 50A and 50B, display judging circuits, respectively receive the display control bit CB from the buffer registers 46 and 47 and control pulses supplied to the load terminal LD and clear terminal C of the P/S converter circuits 52A and 52B, producing a logic "1" at the load terminal LD when the display control bit CB is "1" and a logic "0 " at the clear terminal C when the display control bit CB is "0". In order to produce such outputs, the circuit 50A comprises an inverter 54A and a pair of AND-gates 55A and 56A while the circuit 50B comprises an inverter 54B and a pair of AND-gates 55B and 56B.

In the timing control circuit 48, an oscillator 60 generates a train of clock pulses. A horizontal dot counter 62 counts the number of clock pulses applied from the oscillator circuit 60 and, when the count of the horizontal dot counter 62 attains "7", produces a count-up pulse and at the same time clears its count. A horizontal address counter 64 counts the number of count-up pulses applied from the counter 62 and, when the count of horizontal address counter 64 attains "80", produces a count-up pulse and clears its count. Therefore, the count of the horizontal address counter 64 represents the location of a unit display region in the horizontal direction, that is, the X-coordinate (abscissa) of the unit display region on the CRT screen. The count-up pulses of the horizontal address counter 64 provide a horizontal synchronizing signal.

A vertical dot counter 66 counts the number of count-up pulses applied from the counter 64 and, when the count of the vertical dot counter 66 attains "9", produces a count-up pulse and clears its count. A vertical address counter 68 counts the number of count-up pulses applied from the counter 66 and, when the count of the vertical address counter 68 attains "24", produces a count-up pulse and clears its count. Therefore, the count of the vertical address counter 68 represents the location of a unit display region in the vertical direction, that is, the Y-coordinate (ordinate) of the unit display region on the CRT screen. The count-up pulses of the vertical address counter 68 provide a vertical synchronizing signal.

If a display control bit CB of "1" appears, a load signal in the form of a train of horizontal clock pulses HCL from the horizontal dot counter 62 is applied to the load terminal LD of P/S converter circuit 52A via the AND-gate 56A in the display judging circuit 50A so that picture element data PD are fetched by the P/S converter circuit 52A. Similarly, the load signal is applied to the load terminal LD of P/S converter circuit 52B via the AND-gate 56B in the display judging circuit 50B so that picture element data PD are fetched by the P/S converter circuit 52B. The picture element data PD fetched by the converter circuits 52A and 52B are converted into serial data, producing data outputs for one line of one character, that is, 8 bits. On the other hand, if a display control bit CB of "0" appears, a clear signal is applied to the clear terminal C of the P/S converter circuit 52A via the AND-gate 55A so that picture element data PD cannot be fetched by the converter 52A. Similarly, the clear signal is applied to the clear terminal C of the P/S converter circuit 52B via the AND-gate 55B so that picture element data PD cannot be fetched by the converter 52B. Therefore, all the data transmitted by the clock signal CL and "0". The serial outputs from the P/S converter circuits 52A and 52B controlled independently of each other in this manner are composed at the OR-gate 53 and transmitted to the viewer as a composed output VD.

In case where it is desired to superimpose the contents of the plurality of refresh memories for the purpose of display, "1" may be written into the display control bit in respective refresh memories. In the above embodiment, since the display control bit is added to the display data in terms of the character unit, the superimposition of one character unit upon another character unit can advantageously be controlled. Obviously, if all the display control bits in one refresh memory are assigned "1" and those in the other refresh memory are assigned "0", only the contents of the one refresh memory may be displayed on the screen, producing a not-superimposed picture.

Additionally, the contents of the horizontal address counter and vertical address counter provide addresses of the refresh memories 44 and 45.

Figure 6:
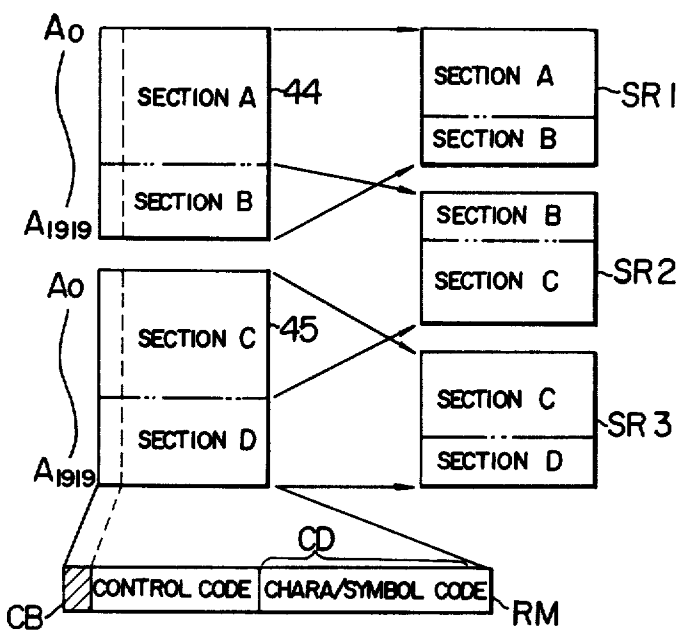
FIG. 6 is a diagrammatic representation useful to explain the operation for shifting display pictures.
Figure 7:
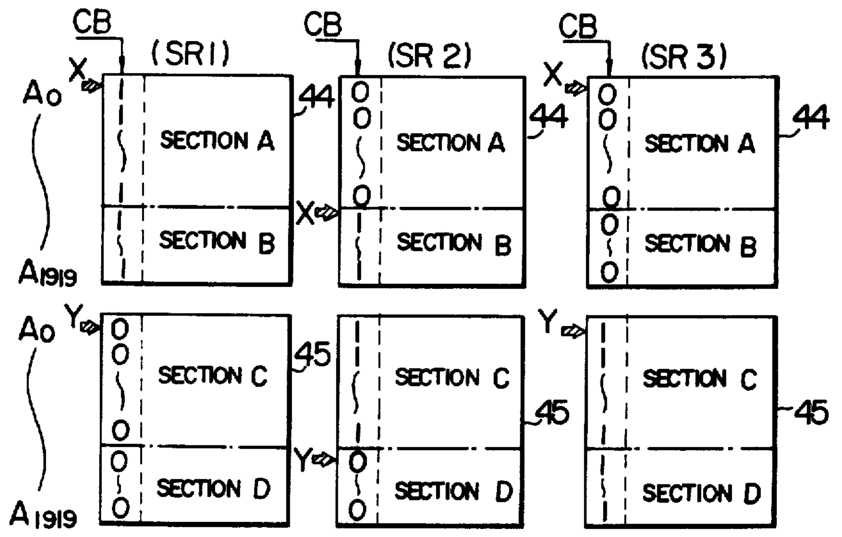
FIG. 7 is a diagrammatic representation showing various states of display control bits in refresh memories in accordance with various shifted picture display operations.

Next, a manner of shifting pictures according to the present system will be described. FIGS. 6 and 7 illustrate how the display on the CRT screen is changed when display control bits CB in the refresh memories 44 and 45 are changed. Different display states on the CRT screen are represented by symbols SR1, SR2 and SR3. In the state SR1, all the display control bits in the memory 44 are "1" and those in the memory 45 are "0" so that only the contents of the memory 44 are displayed. In state SR2, a section B in the memory 44 and a section C in the memory 45 contain display control bits "1" so that the contents of the sections B and C are displayed. In this case, however, if the display is performed with start addresses of address A0 for both the refresh memories, the sections B and C displayed on the CRT screen are reversed in the vertical direction. In order to obtain a vertically correct, continuous display of the sections B and C, the start address register 49 is provided for the timing control circuit 48 as shown in FIG. 4 and start addresses of the refresh memories 44 and 45 are memorized in this register 49.

When start addresses as pointed by arrows X and Y are designated by the start address register 49 as in the state SR2 of FIG. 7, a vertically correct display of the state SR2 can be obtained wherein the sections B and C are in correct continuation in the vertical direction as shown at SR2 in FIG. 6. In the state SR3 of FIG. 7, since all the display control bits in the refresh memory 44 are "0" and those in the refresh memory 45 are "1", only the contents of memory 45 are displayed by reading out the memories 44 and 45 with start addresses A0 as pointed by arrows X and Y. In other words, the state SR3 corresponds to an entire replacement of the display contents of state SR1 (corresponding to the contents memorized in the memory 44) with the contents memorized in the memory 45. In the above description, the vertical shift of pictures is explained but it is obvious to shift pictures horizontally in a similar manner. In this embodiment, it is the microcomputer to play a role in changing, as described in the above, the contents or state of display control bits and the start address for characters in one line or one column on the screen and this will be detailed later with reference to FIG. 11.

Figure 8:
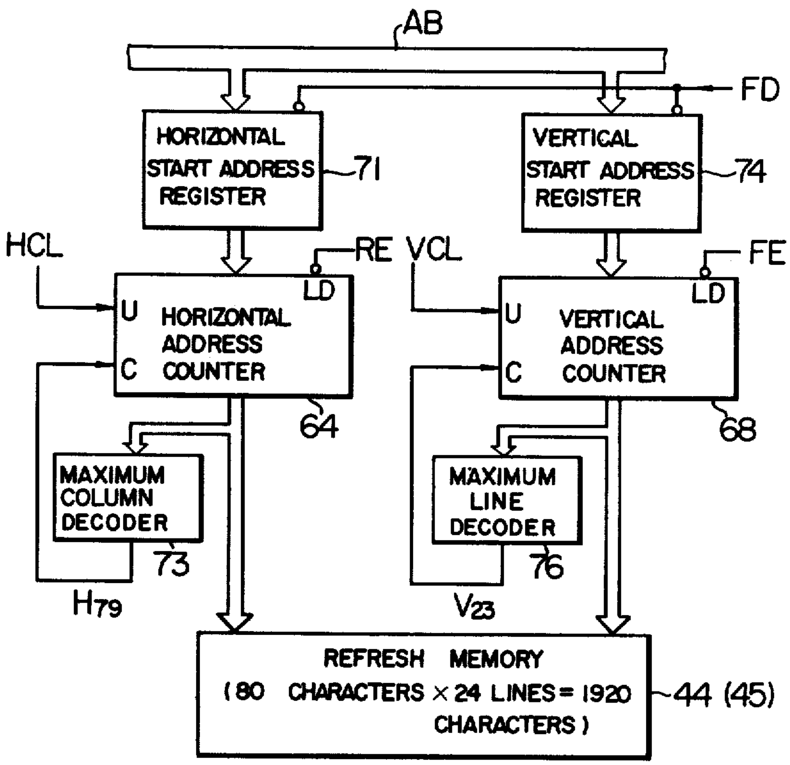
FIG. 8 is a connection diagram of one example of a start address control circuit used for the shifted picture display operation.
Figure 9:
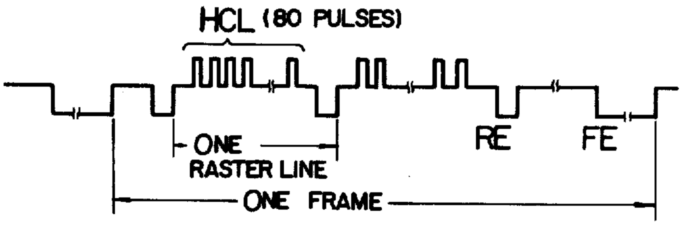
FIG. 9 is a wave form diagram useful to explain the operation of the circuit of FIG. 8.
Figure 10A:
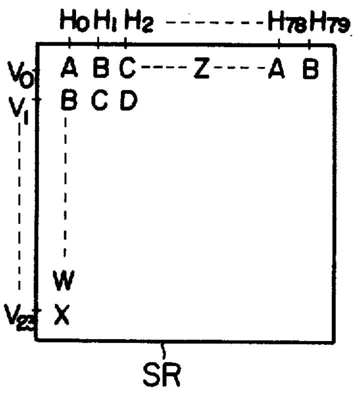
FIGS. 10*a* and 10*b* are diagrammatic representations of exemplified pictures displayed on the CRT screen when the start address is changed.
Figure 10B:
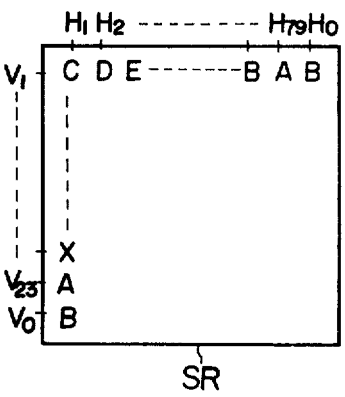

Referring to FIG. 8, the construction and operation of the start address control circuit will now be described in more detail. A horizontal start address register 71 and a vertical start address 74 are connected to the address bus AB. In time with a start address exteriorly applied to the address bus AB, a fetch signal FD manages the address registers 77 and 74 to fetch the state address signal. The fetch signal FD is produced at the microcomputer. The outputs of these address registers 71 and 74 are fetched by the horizontal address counter 64 and vertical address counter 68 by means of pulses RE and FE (See FIG. 9), the horizontal address counter 64 receiving at its load terminal LD a timing signal representative of completion of one scan of the raster line (one raster line) with which the CRT is canned, that is, an input of the pulse RE to the vertical dot counter 66 in FIG. 5 and the vertical address counter 68 receiving at its load terminal LD a timing signal representative of completion of one frame scan, that is, a count-up pulse of the pulse FE from the vertical address counter 68. The horizontal address counter 64, as shown in FIG. 9, receives at its up-terminal U horizontal clock signals HCL each for one character unit which are applied from the horizontal dot counter 62 (FIG. 5) and is rendered count-up thereby, advancing to the last character in one line (as illustrated at $H_{79}$). Then, the address counter 64 receives at its clear terimnal C a signal from a maximum column decoder 73, returning to zero. Similarly, the vertical address counter 68 receives at its up-terminal U vertical clock signals VCL each for one line unit which are applied from the vertical dot counter 66 (FIG. 5) and is rendered count-up thereby, advancing to the maximum line ($V_{23}$). Then, the vertical address counter 68 receives at its clear terminal C a signal from a maximum line decoder 76, returning to zero. In this manner, the outputs of counters 64 and 68 provide address data of the refresh memory 44 or 45. Therefore, memorized contents to be displayed at the start line or the start column are determined by the contents of the start address register 71 or 74 (i.e., start address). For example, in a state SR on the CRT in which as shown in FIG. 10*a* the alphabet is displayed together with a start address of $H_o$ for column and a start address of $V_o$ for line, display locations can readily be changed by changing the start addresses to $H_1$ and $V_1$ as shown in FIG. 10*b*. In brevity, when the contents of the vertical start address register 74 are changed successively every predetermined time, the contents of displayed picture shift in the direction of line (in the vertical direction). On the other hand, when the contents of the horizontal address register 71 are changed, the contents of displayed picture shift in the direction of column (in the horizontal direction). The contents of displayed picture may be shifted obliquely by changing both the vertical and horizontal start addresses simultaneously.

In the universal type data display control system, the shifted picture mode can be realized with ease by providing the start address control circuit as described hereinbefore. Namely, under the control of the microprogram, start addresses of the plurality of refresh memories are switched over at a given picture shift rate every predetermined time and logic "1" or "0" of the display control bits for the addresses corresponding to the switch-over of the fresh memories is changed, these operations being repeated successively, whereby the contents memorized in the plurality of refresh memories can be displayed within one frame in a shifting manner. This assures an easy scroll up or down.

Figure 11:
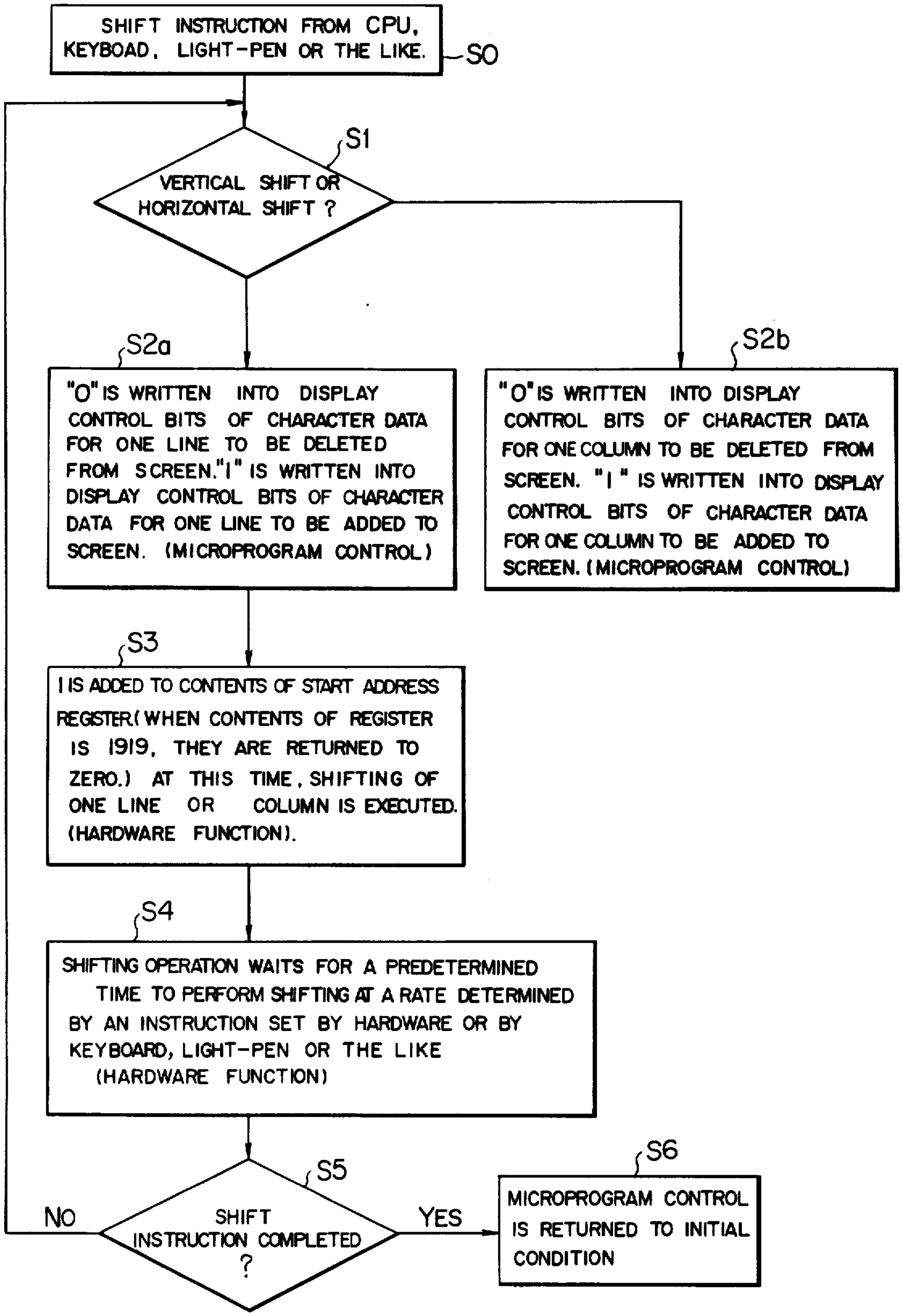
FIG. 11 is a flow chart showing a control operation executed by a micro-computer when the picture display is interlaced.

Turning to FIG. 11, the control operation for changing contents of the display control bit by means of the microcomputer 42 and microprogram 43 will be described. The microcomputer 42 (FIG. 4) receives a shift instruction from the CPU, keyboard, light-pen or the like in step S0 and judges whether a vertical or horizontal shift is instructed. In the case of vertical shift, step **S2*a* is traced where the following operation is carried out by microprogram control. That is, "0" is written into the display control bit of character data information for one line to be deleted from the screen whereas "1" is written into the display control bit of character data information to be added to the screen. In the case of horizontal shift, step S2*b* is traced where a similar write-in operation of "1" or "0" with respect to character data information for one line is performed under the control of the microprogram in a similar manner. It is well known in the art to successively designate specified bits (display control bits) representative of several specified locations in the refresh memories 44 and 45** during the vertical blanking period and to memorize "1" or "0" at these bits, of which description is omitted herein.

Thereafter, as shown in step S3, the contents of the horizontal or vertical start address register are added with one to shift one column or one line. In this case, it is ruled that when the contents of the registers are 1919, they are returned to zero. In step S4, an interruption of a predetermined time waiting occurs to perform a shifted picture display at a shifting rate determined by a hardware or an external instruction. Usually, this waiting time can readily be set by means of a counter which generates a pulse after counting a predetermined number of clock pulses.

Next, as shown in step S5, it is judged whether or not the execution of the shift instruction has been completed. If not completed (in the case of NO), returning to step 1 is executed; it completed (in the case of YES), the microprogram control is returned to the initial condition (step 6).

In the foregoing description, the invention has been described by way of preferred embodiments. However, the invertion is in no way limited to the aforementioned specific embodiments, and various changes and modifications may be made therein without departing from the scope of appended claims. For example, the number of the refresh memories is not limited to two, and more than three refresh memories may be provided.

We claim:

1. A data display control system comprising:

a plurality of refresh memories capable of memorizing display data for one frame, individual display data having at least one display control bit for memorizing a display designating data information which determines whether or not the corresponding display data are to be displayed, a write-in control unit for controlling the writing of the display designating data information into respective display control bits within the respective refresh memories, a timing control circuit for successively and controllably performing the simultaneous reading-out of respective display data memorized in the plurality of refresh memories in time with the display, at least one display judging circuit for judging whether or not the respective display data read out of the respective refresh memories are to be displayed on the basis of the contents of the corresponding display control bit, a video signal forming circuit for converting into video signals the display data read out of the respective refresh memories which are permitted to be displayed by said display judging circuit and composing the video signals, and a display means for displaying the video signals from the video signal forming circuit under the control of the timing control circuit.

2. A data display control system according to claim 1, wherein said timing control circuit includes a start address register for designating an address of the respective refresh memories to be displayed at the start location on the display means.

3. A data display control system according to claim 2 which further comprises means for changing the contents of said start address register at a given period and for reversing the contents of the display control bits for one group of display data memorized in the respective refresh memories which are not to be displayed with respect to the contents of the display control bits for the other group of display data memorized in the respective refresh memories which are to be introduced into the display, whereby the display of the display means is shifted.

4. A data display control system according to claim 1, wherein said display control bit has its contents in the form of a logic "1" or "0", and said display judging circuit effects the judgement of display data by using a logic gate to which are subjected the contents of the display control bit for the display data read out of the refresh memory and pulses generated every time that the respective display data are read out.

5. A data display control system according to claim 4, wherein said video signal forming circuit, when receiving the pulses from said logic gate, converts the readout display data into video signals and transmits the video signals to said display means.

* * * * *